United States Patent
Wills et al.

(10) Patent No.: US 7,096,681 B2
(45) Date of Patent: Aug. 29, 2006

(54) SYSTEM AND METHOD FOR VARIABLE SPEED OPERATION OF A SCREW COMPRESSOR

(75) Inventors: Frank Eugene Wills, York, PA (US); Harold Robert Schnetzka, York, PA (US); Douglas Alan Kester, York, PA (US); John F. Judge, Stewartstown, PA (US); Mahesh Valiya-Naduvath, Lutherville, MD (US); Israel Federman, York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 10/788,723

(22) Filed: Feb. 27, 2004

(65) Prior Publication Data

US 2005/0188708 A1    Sep. 1, 2005

(51) Int. Cl.
*F25B 7/00* (2006.01)
*F25B 1/00* (2006.01)
*F25B 49/00* (2006.01)

(52) U.S. Cl. .................. 62/175; 62/228.1; 62/230; 62/510; 417/2; 417/44.1; 417/45

(58) Field of Classification Search .................. 62/175, 62/201, 228.1, 228.4, 230, 498, 510; 417/2, 417/22, 15, 44.1, 45
See application file for complete search history.

(56) References Cited

U.S. PATENT DOCUMENTS

| | | | |
|---|---|---|---|
| 3,390,320 A | 6/1968 | Kammiller et al. | |
| 3,621,365 A | 11/1971 | Beck et al. | |
| 3,909,687 A | 9/1975 | Abbondanti | |
| 4,150,425 A | 4/1979 | Nagano et al. | |
| 4,151,725 A | 5/1979 | Kountz et al. | |
| 4,152,902 A | 5/1979 | Lush | |
| 4,492,546 A | 1/1985 | Hartwig et al. | |
| 4,546,423 A | 10/1985 | Seki | |
| 4,656,571 A | 4/1987 | Umezu et al. | |
| 4,787,211 A | 11/1988 | Shaw | |
| 4,879,639 A | 11/1989 | Tsukahara et al. | |

(Continued)

FOREIGN PATENT DOCUMENTS

DE    100 03 869 A1    8/2001

(Continued)

OTHER PUBLICATIONS

Murphy, J.M.D., "Thyristor Control of A.C. Motors", Principles of Variable-Frequency A.C. Drives, Oct. 10, 1975, pp. 3-4, 111-114, & 120-121, Pergamon Press, New York.

*Primary Examiner*—Marc Norman
(74) *Attorney, Agent, or Firm*—McNees Wallace & Nurick LLC

(57) ABSTRACT

A system and method are provided for variable speed operation of a screw compressor to obtain increased capacity and efficiency. The screw compressor is connected to an induction motor driven by a variable speed drive, wherein the screw compressor has a variable output capacity that is dependent on the output speed of the motor. To obtain increased capacity and efficiency, the screw compressor is operated at a speed greater than the screw compressor's rated speed and does not include a slide valve. The maximum operating speed of the screw compressor, which speed is greater than the rated speed, is related to the maximum operating speed of the motor when operated at a voltage and frequency provided by the variable speed drive that is greater than the motor's rated voltage and frequency in a constant flux or constant volts/Hz mode.

35 Claims, 4 Drawing Sheets

U.S. PATENT DOCUMENTS

| | | |
|---|---|---|
| 4,958,118 A | 9/1990 | Pottebaum |
| 5,010,287 A | 4/1991 | Mukai et al. |
| 5,350,992 A | 9/1994 | Colter |
| 5,446,645 A | 8/1995 | Shirahama et al. |
| 5,488,279 A | 1/1996 | Kawamoto et al. |
| 5,492,273 A | 2/1996 | Shah |
| 5,503,248 A | 4/1996 | Peruggi et al. |
| 5,509,504 A | 4/1996 | McHugh et al. |
| 5,528,114 A | 6/1996 | Tokizaki et al. |
| 5,845,509 A | 12/1998 | Shaw et al. |
| 6,008,616 A | 12/1999 | Nagayama et al. |
| 6,018,957 A | 2/2000 | Katra et al. |
| 6,031,738 A | 2/2000 | Lipo et al. |
| 6,124,697 A | 9/2000 | Wilkerson |
| 6,185,946 B1 | 2/2001 | Hartman |
| 6,229,722 B1 | 5/2001 | Ichikawa et al. |
| 6,325,142 B1 | 12/2001 | Bosley et al. |
| 6,370,888 B1 | 4/2002 | Grabon |
| 6,408,645 B1 | 6/2002 | Tsuboe et al. |
| 6,434,960 B1 | 8/2002 | Rousseau |
| 6,459,596 B1 | 10/2002 | Corzine |
| 6,459,606 B1 | 10/2002 | Jadric |
| 6,579,067 B1 | 6/2003 | Holden |
| 2003/0041605 A1 | 3/2003 | Butcher et al. |
| 2003/0098668 A1* | 5/2003 | Jadric et al. ............ 318/801 |

FOREIGN PATENT DOCUMENTS

| | | |
|---|---|---|
| DE | 1004 7629 | 4/2002 |
| EP | 0 695 024 A2 | 1/1996 |
| EP | 704 784 | 4/1996 |
| EP | 1 022 844 A2 | 7/2000 |
| EP | 1 055 885 A2 | 11/2000 |
| GB | 1579045 | 11/1980 |
| JP | 57 018484 | 5/1982 |
| JP | 60102878 | 6/1985 |
| WO | WO 97/18420 | 5/1997 |
| WO | WO 03/044939 | 5/2003 |

* cited by examiner

SYSTEM AND METHOD FOR VARIABLE SPEED OPERATION OF A SCREW COMPRESSOR

BACKGROUND OF THE INVENTION

The present invention relates generally to the operation of a screw compressor. More specifically, the present invention relates to the variable speed operation of a screw compressor connected to a motor powered by a variable speed drive that can provide the motor an input voltage and frequency greater than the motor's rated voltage and frequency.

The capacity of a screw compressor is based on the amount of gas entering the screw compressor and the rotational speed of the screws or rotors compressing the gas. In the past, the speed of the rotors of a screw compressor was limited to the maximum rated output speed of the induction motor driving the rotors of the screw compressor. This single speed screw compressor would have a single output capacity based upon the rotor speed in the screw compressor. To get a rotor speed greater than the maximum rated speed of the induction motor and a corresponding increase in the output capacity of the screw compressor, a gearing arrangement had to be connected between the motor and rotors of the screw compressor. However, the introduction of the gearing arrangement to obtain increased rotor speeds in the screw compressor resulted in a reduction in the efficiency of the compressor system and increased cost and maintenance for the compressor system. In addition, the screw compressor still only has one output capacity because the rotors are still being driven at a single (albeit faster) speed.

Next, several techniques were developed to obtain a variable capacity in a screw compressor. In one technique, the screw compressor includes a slide valve to obtain variable capacities. The slide valve operates to divert a portion of the gas being compressed by the rotors away from the compressor discharge. Often, the gas diverted by the slide valve is returned to the suction inlet of the compressor. While the incorporation of a slide valve can provide a variable output capacity screw compressor, there are several drawbacks to using a slide valve. First, the slide valve provides a leakage passageway for gas, thereby reducing the efficiency of the compressor. Next, the incorporation of a slide valve in a screw compressor involves a complicated machining process and a corresponding increased cost. Finally, the maximum rotor speed and capacity of the screw compressor are based on the maximum rated speed of the motor and a gearing arrangement would be required to obtain a rotor speed greater then the rated motor speed.

Another technique for obtaining a variable capacity in a screw compressor involves connecting the motor of the screw compressor to a variable speed drive. The variable speed drive can vary the frequency and/or voltage that is provided to the motor to vary the output speed of the motor, which, in turn, varies the speed of the rotors to obtain variable output capacities of the screw compressor. However, most variable speed drives are not capable of providing an output voltage greater than the input voltage. This limitation on the output voltage of the variable speed drive limits the maximum speed of the motor to a speed that corresponds to the speed of the motor operated at line voltage. As discussed above, to obtain greater rotor speeds in the compressor, a gearing arrangement has to be incorporated between the motor and the rotors to increase the output rotational speed of the motor driving the rotors of the compressors.

Therefore, what is needed is a system and technique for variable speed operation of a screw compressor that does not involve a slide valve and can provide increased rotor speeds without the use a gearing arrangement.

SUMMARY OF THE INVENTION

One embodiment of the present invention is directed to a method of increasing the output capacity of a screw compressor. The method includes the steps of providing a motor having a predetermined rated operational voltage and frequency and providing a variable speed drive capable of supplying a voltage and frequency to the motor greater than the predetermined rated operational voltage and frequency of the motor. The predetermined rated operational voltage and frequency of the motor generates a predetermined output speed of the motor. Next, a screw compressor is connected to the motor. The screw compressor has a predetermined output capacity in response to operation at the predetermined output speed of the motor. The variable speed drive is operated to supply a voltage and frequency to the motor greater than the predetermined rated operational voltage and frequency of the motor. The motor generates an output speed greater than the predetermined output speed of the motor as a result of the supplied voltage and frequency to the motor being greater than the predetermined rated operational voltage and frequency of the motor. Finally, the screw compressor is driven at the generated speed of the motor, which is greater than the predetermined output speed of the motor to obtain an output capacity greater than the predetermined output capacity of the screw compressor.

Another embodiment of the present invention is directed to a compression system including a motor having a predetermined rated operational voltage and frequency, a variable speed drive connected to the motor to power the motor, and a screw compressor connected to the motor. The motor is configured to generate a predetermined output speed in response to operating at the predetermined rated operational voltage and frequency. The variable speed drive is configured to supply a variable output voltage and variable output frequency to the motor. The variable output voltage and variable output frequency ranges between an output voltage and output frequency less than the predetermined rated operational voltage and frequency, and an output voltage and output frequency greater than the predetermined rated operational voltage and frequency. The screw compressor is configured to provide a predetermined output capacity in response to being driven at the predetermined output speed of the motor. The motor can generate an output speed greater than the predetermined output speed in response to operation at a supplied voltage and frequency greater than the predetermined rated operational voltage and frequency, and the screw compressor provides an output capacity greater than the predetermined output capacity in response to being driven at an output speed of the motor greater than the predetermined output speed of the motor.

One advantage of the present invention is more efficient screw compressor operation from increased rotor speeds that reduce gas leakage and increase the rotor seal.

Another advantage of the present invention is that the operating efficiency, speed and horsepower of an induction motor can be increased.

Still another advantage of the present invention is that increased system efficiency can be obtained at part or partial load conditions.

A further advantage of the present invention is that increased compressor capacity can be obtained.

Yet another advantage of the present invention is that one motor and compressor configuration can be used with a variety of input voltages and frequencies.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
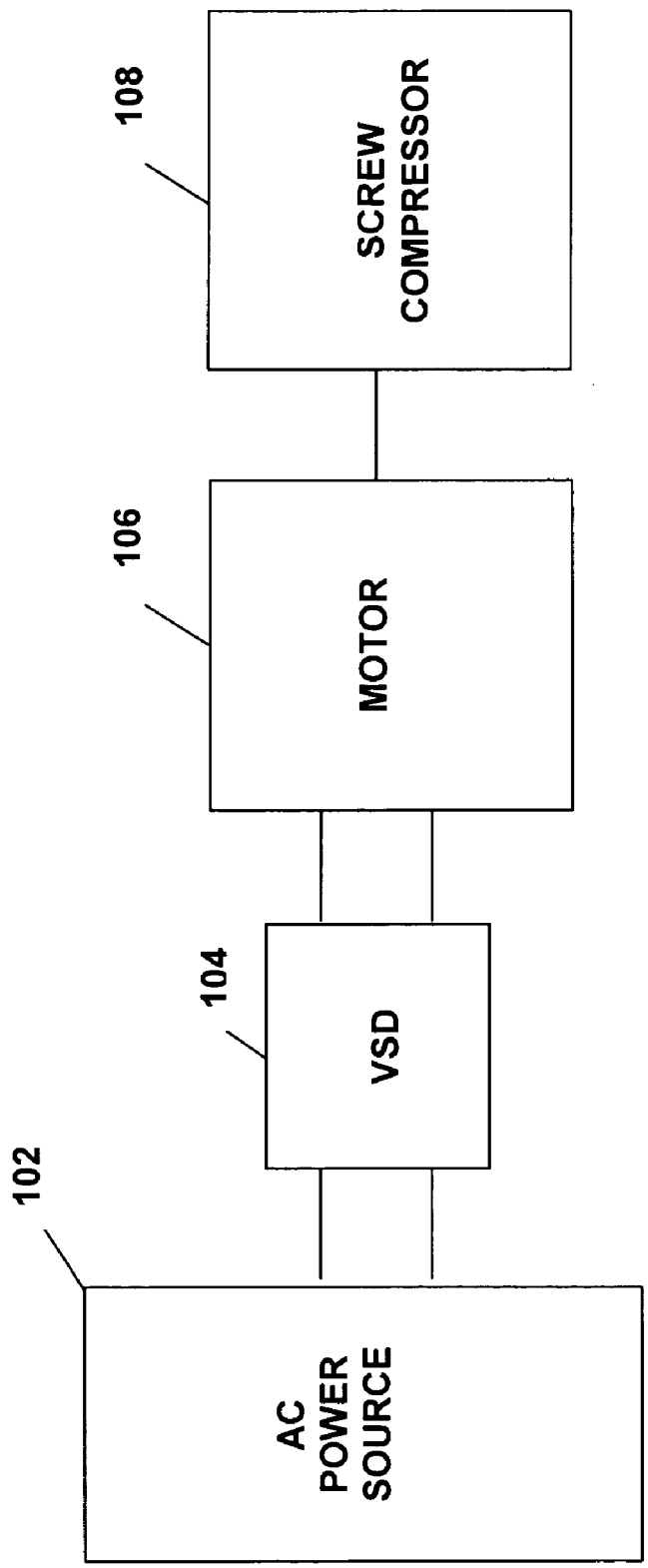
FIG. 1 illustrates schematically a general system configuration of the present invention.

FIG. 1 illustrates generally the system configuration of the present invention. An AC power source 102 supplies a variable speed drive (VSD) 104, which powers a motor 106 that drives a screw compressor 108. The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V, at a line frequency of 50 Hz or 60 Hz, to the VSD 104 depending on the corresponding AC power grid.

Figure 2:
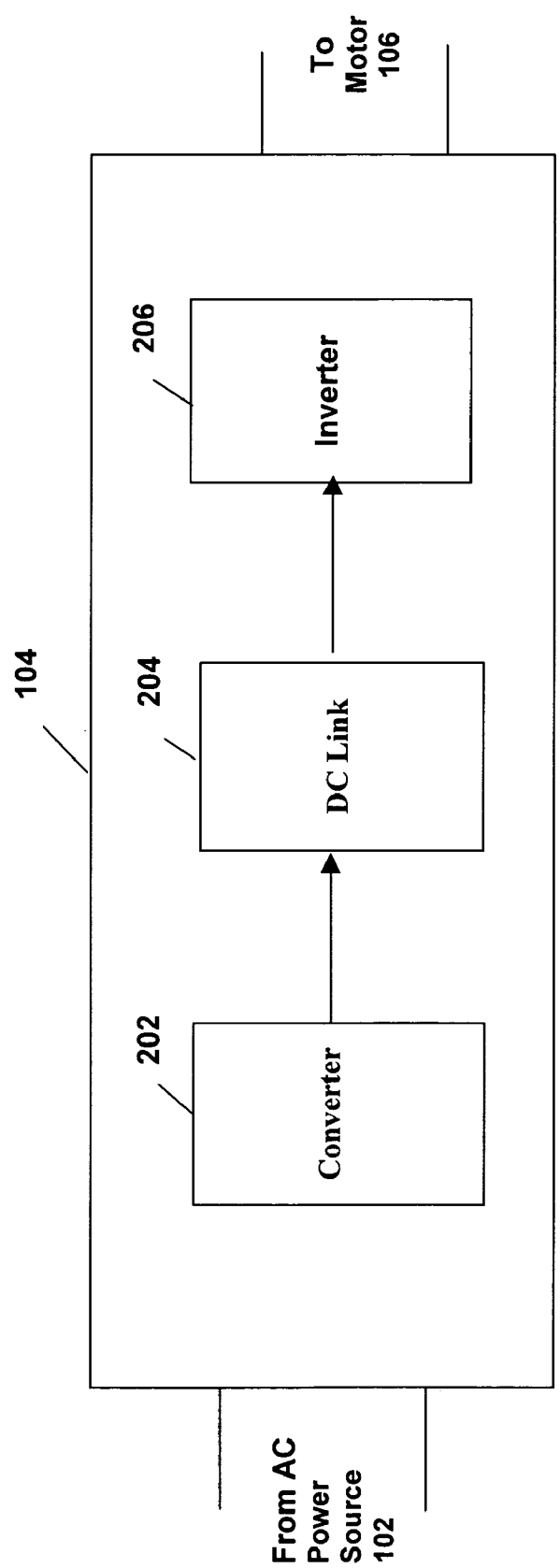
FIG. 2 illustrates schematically one embodiment of a variable speed drive used in the present invention.

The VSD 104 receives AC power having a particular fixed line voltage and fixed line frequency from the AC power source 102 and provides AC power to the motor 106 at a desired voltage and desired frequency, both of which can be varied to satisfy particular requirements. Preferably, the VSD 104 can provide AC power to the motor 106 having higher voltages and frequencies and lower voltages and frequencies than the rated voltage and frequency of the motor 106. FIG. 2 illustrates schematically some of the components in one embodiment of the VSD 104. The VSD 104 can have three stages: a converter stage 202, a DC link stage 204 and an inverter stage 206. The converter 202 converts the fixed line frequency, fixed line voltage AC power from the AC power source 102 into DC power. The DC link 204 filters the DC power from the converter 202 and provides energy storage components such as capacitors and/or inductors. Finally, the inverter 206 converts the DC power from the DC link 204 into variable frequency, variable voltage AC power for the motor 106.

The particular configurations of the converter 202, DC link 204 and inverter 206 are not critical to the present invention so long as the VSD 104 can provide appropriate output voltages and frequencies to the motor 106. For example, the converter 202 can be a diode or thyristor rectifier coupled to a boost DC/DC converter to provide a boosted DC voltage to the DC link 204 in order to obtain an output voltage from the VSD 104 greater than the input voltage of the VSD 104. In another example, the converter 202 can be a pulse width modulated boost rectifier having insulated gate bipolar transistors (IGBTs) to provide a boosted DC voltage to the DC link 204 to obtain an output voltage from the VSD 104 greater than the input voltage of the VSD 104. In a preferred embodiment of the present invention, the VSD 104 can provide output voltages and frequencies that are at least twice the rated voltage and frequency of the motor 106. Furthermore, it is to be understood that the VSD 104 can incorporate different components from those shown in FIG. 2 so long as the VSD 104 can provide the motor 106 with appropriate output voltages and frequencies.

The VSD 104 can prevent a large inrush current from reaching the motor 106 during the startup of the motor 106. The inverter 206 of the VSD 104 can provide the motor 106 with power having about a unity power factor. Finally, the ability of the VSD 104 to adjust both the output voltage and output frequency to the motor 106 permits the VSD 104 to be operated on a variety of foreign and domestic power grids without having to alter the motor 106 or the screw compressor 108 for different power sources.

Figure 3:
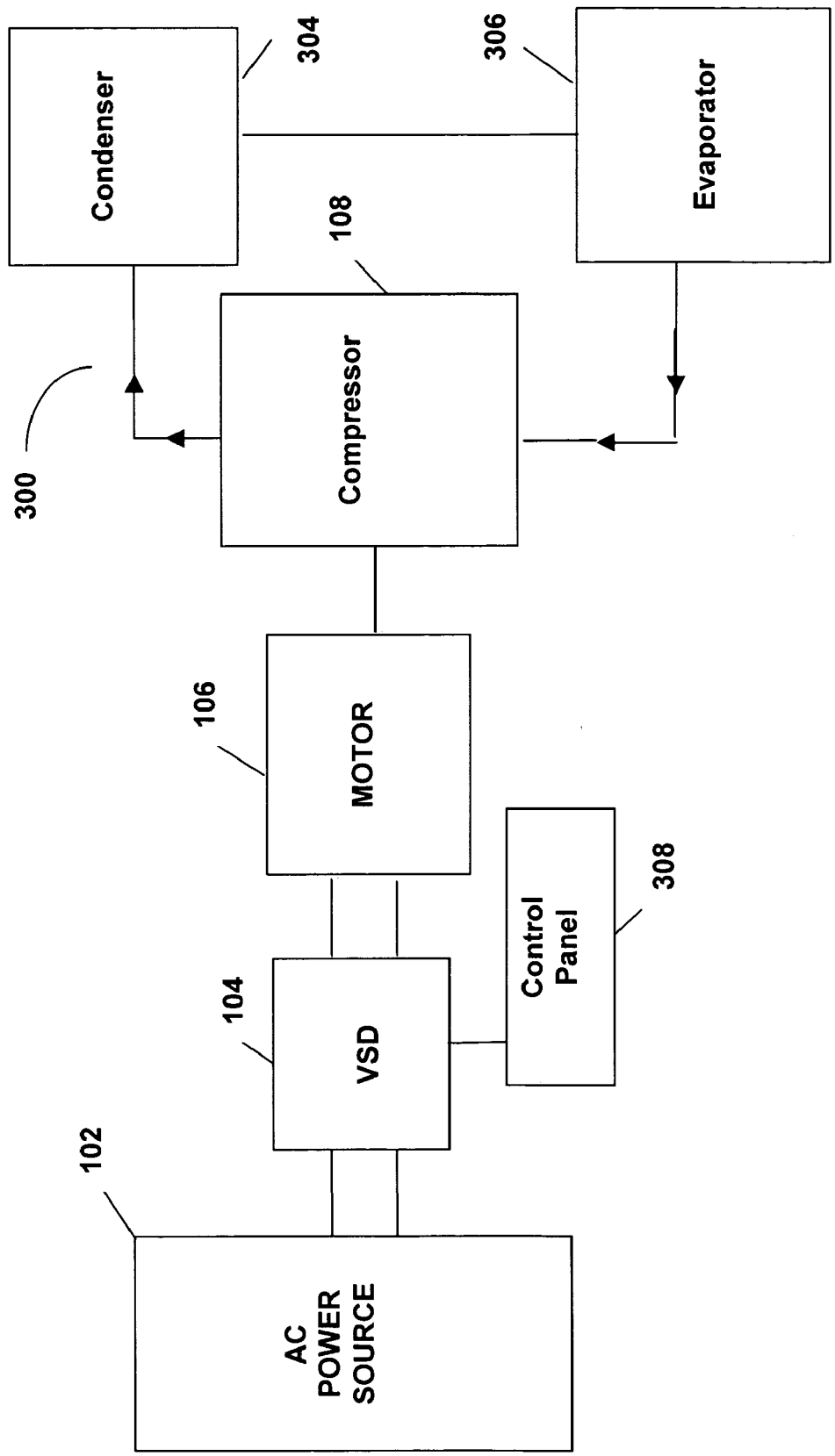
FIG. 3 illustrates schematically a refrigeration system that can be used with the present invention.

The motor 106 is preferably an induction motor that is capable of being operated at variable speeds. The induction motor can have any suitable pole arrangement including two poles, four poles or six poles. The induction motor is used to drive a screw compressor 108. The screw compressor 108 has a variable output capacity that is dependent on the output speed of the motor 106 driving the rotors of the screw compressor 108. In other words, the output speed of the motor 106 can control the output capacity of the screw compressor 108. For example, a lower output speed of the motor results in a lower output capacity of the compressor, while a higher output speed of the motor results in a higher output capacity of the compressor. In one embodiment of the present invention, the system and method of the present invention can be used in a refrigeration or chiller system to obtain an increased capacity of the refrigeration or chiller system. FIG. 3 illustrates generally one embodiment of the system of the present invention incorporated in a refrigeration or chiller system.

As shown in FIG. 3, the HVAC, refrigeration or liquid chiller system 300 includes the screw compressor 108, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104, the motor 106 and the screw compressor 108. The conventional refrigeration system 300 includes many other features that are not shown in FIG. 3. These features have been purposely omitted to simplify the drawing for ease of illustration.

Screw compressor 108 receives refrigerant vapor at a suction inlet and compresses the refrigerant vapor in the meshing rotors of the screw compressor 108. The screw compressor 108 then discharges the compressed vapor through a discharge line. As discussed above, the output capacity of the screw compressor 108 is based on the speed of the rotors of the screw compressor 108, which rotor speed is dependent on the output speed of the motor 106 powered by the VSD 104. The refrigerant vapor delivered by the compressor 108 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to an evaporator 306.

The liquid refrigerant in the evaporator 306 enters into a heat exchange relationship with a second fluid, e.g., air or water, to lower the temperature of the second fluid. The refrigerant liquid in the evaporator 306 undergoes a phase change to a refrigerant vapor as a result of the heat exchange relationship with the second fluid. The vapor refrigerant in the evaporator 306 exits the evaporator 306 and returns to the screw compressor 108 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The present invention obtains increased capacity and efficiency from a screw compressor 108 by operating the screw compressor 108 at a speed greater than the screw compressor's rated speed and by not incorporating a slide valve in the screw compressor 108. The maximum operating speed of the screw compressor 108 is related to the maximum operating speed of the motor 106 when operated at a voltage and frequency greater than the motor's rated voltage and frequency in a constant flux or constant volts/Hz mode. When operated at a greater speed than the rated speed for the screw compressor 108, the screw compressor 108 provides a greater seal between the rotors and reduces gas leakage, thereby increasing compressor efficiency. Furthermore, the elimination of the slide valve in the screw compressor results in additional increases in efficiency through the removal of possible leakage passageways for the gas.

The connection of the screw compressor 108 to the motor 106 powered by the variable speed drive 104 permits the screw compressor 108 to be operated at lower speeds and capacities in addition to the higher speeds and capacities. Since the variable speed drive 104 can provide the motor 106 with a reduced input frequency and voltage, the output speed of the motor 106 can be reduced, resulting in a reduced rotor speed of the screw compressor 108 and a corresponding reduced output capacity of the screw compressor 108.

In addition, for a constant torque load such as a screw compressor, the operation of the motor 106 in the constant flux or constant volts/Hz mode at speeds higher or greater than the motor's rated speed can provide more efficient motor operation. When driving constant torque loads, the current drawn by the motor 106 remains relatively constant as the input voltage and frequency to the motor 106 are increased. Since the motor current remains relatively constant, the losses in the motor 106 remain relatively constant. Thus, the output horsepower of the motor 106 is increased while the motor current drawn by the motor 106 and the corresponding losses in the motor 106 have remained substantially the same, which provides for greater motor efficiency than the same motor 106 driven at the rated voltage and frequency of the motor 106.

One embodiment of the present invention for obtaining increased horsepower and efficiency in the motor 106 and increased capacity of the screw compressor 108 involves connecting the motor 106 to a VSD 104 that is capable of providing the motor 106 with an input voltage and input frequency that is greater than the motor's rated voltage and frequency. In one example, the motor 106 can be rated for the corresponding line voltage and line frequency and the VSD 104 can provide an output voltage and output frequency to the motor 106 that is greater than the line voltage and line frequency. Alternatively, the motor 106 can be rated for the corresponding line frequency, and a voltage less than the corresponding line voltage and the VSD 104 can provide an output voltage substantially equal to the line voltage and an output frequency greater than line frequency. In either arrangement, the motor 106 is receiving an input voltage and input frequency that is greater than the motor's rated voltage and frequency.

In addition, since the VSD 104 can provide a variable input voltage and variable input frequency to the motor 106, the motor 106 and the screw compressor 108 can be operated at a variety of different levels depending on the particular requirements of the system. Preferably, a control panel, microprocessor or controller can provide control signals to the VSD 104 to control the operation of the VSD 104 to provide the optimal operational setting for the motor 106 and screw compressor 108 depending on the particular sensor readings received by the control panel. For example, in the refrigeration system 300 of FIG. 3, the control panel 308 can adjust the output voltage and frequency of the VSD 104 to correspond to changing conditions in the refrigeration system 300, i.e., the control panel 308 can increase or decrease the output voltage and frequency of the VSD 104 in response to increasing or decreasing load conditions on the compressor 108 in order to obtain a desired operating speed of the motor 106 and a desired output capacity of the compressor 108.

Figure 4:
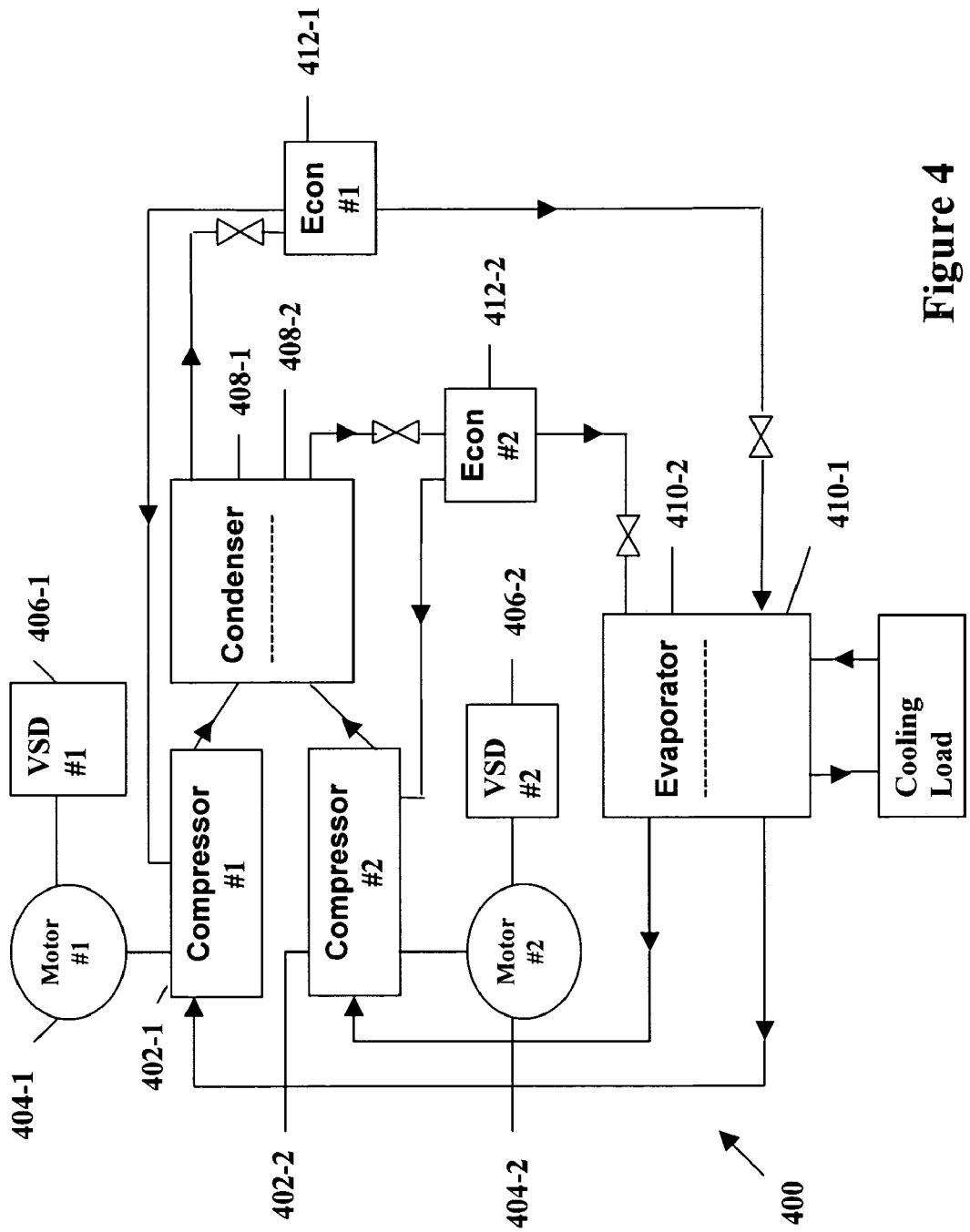
FIG. 4 illustrates schematically another embodiment of a refrigeration system that can be used with the present invention.

FIG. 4 illustrates one specific embodiment of a refrigeration system incorporating the present invention. The refrigeration system 400 is a liquid chiller system using R-134a refrigerant to circulate a chilled liquid to various locations in an installation. The refrigeration system 400 includes the following primary components: two or more screw compressors 402 driven by corresponding motors 404 powered by one or more variable speed drives 406; a condenser system 408; an evaporator system 410; economizers 412; and a control panel (not shown). The refrigeration system 400 also includes many other secondary components and features that are not discussed in detail herein. These components have been purposely omitted to simplify the drawing for ease of illustration.

The refrigeration system 400 shown in FIG. 4 includes two compressors 402 to provide refrigerant compression to two parallel refrigerant circuits. The components of each refrigerant circuit are identified with a corresponding suffix of "-1" or "-2" depending on the corresponding refrigerant circuit. For example, the compressor for the first refrigerant circuit is identified by the reference numeral 402-1. In another embodiment, each refrigerant circuit can include more than one compressor 402 connected in parallel. In a further embodiment, the refrigeration system 400 can include additional compressors 402 connected into additional parallel refrigerant circuits. Each screw compressor 402 is a conventional rotary screw compressor with a fixed volume ratio that draws refrigerant gas into the threads of the rotors, compresses the refrigerant gas, and expels the refrigerant gas through a discharge port. The screw compressor 402 has male and female rotors that are machined to fit together with small clearances between individual lobes and flutes. In one embodiment, the rotors will be a 5+7 Lobe combination. The diameter of the rotor can vary between 145.3 mm, 136.4 mm, and 124 mm all of which have an L/D of about 1.4.

In one embodiment, the casing of the screw compressor 402 is gray cast iron and is class 30 for improved leak resistance, improved machining, increased sound dampening, and reduced cost. The suction and discharge connections for the screw compressor 402 are oriented axially and can be ANSI connections for 300-class service. The bearings of the screw compressor 402 can be rolling element ISO style bearings of a class ABEC 1. For radial loads, the screw compressor 402 can use cylindrical roller bearings. For thrust or axial loads, the screw compressor 402 can use angular contact bearings. In one embodiment, a 3-micron absolute filter for filtering refrigerant is incorporated into the body of the screw compressor 402 and can be externally accessible for replacement. Finally, the screw compressor 402 can have an external hybrid muffler that is constructed of schedule 40 pipe and includes a reactive section that is tuned for a 200 Hz compressor discharge pumping frequency as well as a passive section that includes fiberglass with a Kevlar casing (to absorb higher frequency noise). The muffler can have a length of 25 inches and a diameter of 6 inches. In still another embodiment, the muffler can include only a reactive section and have a length of about 18 inches.

The mechanical screw mechanisms or rotors of each screw compressor 402 are driven by a corresponding motor 404 powered by a corresponding variable speed drive 406. In one embodiment, the motor 404 is a standard four pole, 138 VAC, 60 Hz, 68.1 Hp induction motor. The motor 404 can be operated in a linear volts/Hz manner to a maximum voltage/frequency of 460VAC/200 Hz, which is a multiple of the rated voltage and frequency of the motor 404, using a variable speed drive 406. The variable speed drive 406 is designed to provide the motor 404 operating in the linear volts/Hz manner discussed above with boosted voltage and frequency to provide greater than rated horsepower. The variable speed drive 406 can provide voltages to the motor 404 having a frequency in the range of approximately 20–200 Hz. The load applied to the motor 404 is a substantially constant torque screw compressor load. The motor 404 provides about 169.3 KW (227 Hp) to the load at an efficiency of about 93.5%. The suction gas coming into the compressor 402 can provide cooling for the motor 404.

In an alternate embodiment, a single variable speed drive (VSD) 406 can power multiple motors 404. The single VSD 406 powering multiple motors 404 can employ one or two input AC to DC converters, a corresponding DC link for each converter and multiple DC to AC inverter modules for each DC link to provide dedicated output modules for each corresponding compressor motor 404. For some embodiments of the refrigeration system 400 having 2 or 3 compressors, only one converter and DC link can be used in the single VSD 406, while a configuration of the refrigeration system 400 having 4 compressors can use two converters and two DC links in the single VSD 406. The VSD 406 can provide voltages to the motors 404 having a frequency in the range of approximately 20–200 Hz. The boosted voltage for the motors 404, as described above, can be obtained from the VSD 406 by maintaining the DC link voltage at about 621 VDC to correspond to the AC power source or line voltage. In situations where the nominal distribution voltage is not 480 VAC, an autotransformer can be incorporated into the VSD 406 to adjust the input voltage to 480 VAC for further boosting by the VSD 406.

A separate cooling system is used for the cooling of the VSD 406. A brine loop of a propylene glycol—water mixture can preferably be used to cool the VSD 406. While the propylene glycol—water mixture is preferred, it is to be understood that any suitable brine or cooling liquid, such as an ethylene glycol—water mixture, can be used in the VSD cooling system loop. The warm brine from the VSD cooling system can be cooled with ambient air. Some of the tubes or coils in the condenser system 408 can be allocated for VSD cooling.

The operation of the screw compressors 402 at higher than mains frequency in tandem with an induction motor-VSD combination that operates in a linear volts/Hz manner yields higher overall efficiencies. This higher efficiency is due to operation of the motor 404 at greater than rated motor nameplate voltage and frequency and operating the screw compressor 402 at greater than rated speed with no slide valve. Elimination of the slide valve reduces leakage and improves reliability. Operation at greater speeds increases the sealing capability of the compressor 402 and improves compressor efficiency.

A compressor 402 can be loaded/unloaded by using the VSD 406 to vary the speed of the motor 404, which thereby varies the speed of the compressor 402, and thus the load of the compressor 402. The loading/unloading of the compressor 402 is essentially infinitely variable between the minimum and maximum speed points for the compressor 402. The compressor 402 minimum load point corresponds to the VSD 406 providing a corresponding input voltage at about 20 Hz to the motor 404.

As discussed above, the VSD 406 varies the speed of the motor 404 (and the compressor 402) to obtain the desired capacity of the compressor 402 in response to control signals received from a control panel. The control panel uses a fuzzy logic control routine to determine the appropriate operating speed for the VSD 406 and the appropriate number of compressors 402 to engage, to obtain the optimum system operation for the particular system conditions. The control panel then sends the appropriate control signals to the VSD 406 to adjust the VSD output. The fuzzy logic control routine receives as inputs the leaving chilled liquid temperature (LCHLT) error, which is the difference between the LCHLT measured at the evaporator 410 and a predetermined setpoint, and the LCHLT error rate, which is the rate of change of the LCHLT error over the sampling period. In addition, the control panel can also determine when the loading and unloading of the compressors 402 should occur using another control algorithm that monitors the discharge pressure of the compressor 402, the motor current, the suction pressure of the compressor 402 and the motor temperature as inputs.

The condenser system 408 of the refrigeration system 400 is an air-cooled condenser that cools the hot refrigerant gas from the compressors with ambient air to desuperheat, condense and subcool the refrigerant leaving the condenser system 408. The condenser system 408 includes a plurality of separate coils of copper tubing for each refrigerant circuit, which tubing is smooth on the outside and enhanced on the inside, with aluminum fins surrounding the copper tubing. In other words, each refrigerant circuit has its own set of coils in the condenser system 408. The coils can be structured in a "V" or "W" configuration. Multiple fans will move the air through the coils based on control instructions received from the control panel to regulate the speed and number of fans in response to particular system conditions. The condenser fan assemblies can be 900 mm, 3-bladed Crowley fans driven by 6-pole, 2 HP motors. Alternatively, the condenser fan assemblies can have 30-inch Revcor forward-swept metal impellers driven by 6-pole, 1.5 HP motors. The condenser system 408 is also used to cool the oil in the system 400. Some of the copper tubes of the condenser system 408 are dedicated to oil cooling and receive oil from a separate oil circuit. The oil cooled in the condenser system 408 is returned to the compressors 402.

In an alternate embodiment, the condenser system 408 of the refrigeration system 400 can be a water-cooled condenser instead of an air-cooled condenser. The refrigerant vapor flowing in the condenser coils for each refrigerant circuit, as described above, enters into the heat exchange relationship with water, flowing through piping connected to a cooling tower. The refrigerant vapor in the condenser system 408 undergoes a phase change to a refrigerant liquid as a result of the heat exchange relationship with the water.

The evaporator system 410 of the refrigeration system 400 has a plurality of separate coils or tubes for each refrigerant circuit. Refrigerant is circulated through the tubes of each circuit and is surrounded by a liquid to be chilled for a cooling load. The evaporator system 410 has piping connections that receive warmed liquid from the cooling load and provide chilled liquid to the cooling load. A secondary liquid, which is preferably water, but can be any other suitable secondary liquid, e.g., ethylene, calcium chloride brine or sodium chloride brine, travels into the evaporator system 410 via a return line and exits the evaporator system 410 via a supply line. The liquid refrigerant in the coils of the separate refrigerant circuits of the evaporator system 410 enter into a heat exchange relationship with the secondary liquid to chill the temperature of the secondary liquid. The refrigerant liquid in the coils of the evaporator system 410 undergoes a phase change to a refrigerant vapor as a result of the heat exchange relationship with the secondary liquid. The vapor refrigerant in the coils of the evaporator system 410 exits the evaporator system 410 and returns to the corresponding compressor 402 of the refrigerant circuit by a suction line to complete the cycle.

Alternatively, the evaporator system 410 can be a flooded evaporator. The flooded evaporator is a shell and tube heat exchanger with the refrigerant on the shell side and the fluid to be cooled flowing inside the tubes. The separate refrigerant circuits can be maintained in the evaporator system 410 by using partitions and barriers in an evaporator shell. The evaporator system 410 can preferably include a heat-exchanger coil having a supply line and a return line connected to the cooling load. The heat-exchanger coil can include a plurality of tube bundles within the evaporator 410.

The piping for the refrigeration system 400 generally requires larger line sizes for the R-134a refrigerant, which refrigerant will be pumped at higher flow rates to achieve similar capacities to R-22 refrigerant. The refrigeration system 400 incorporates an economizer 412 into each refrigerant circuit to increase system capacity and performance. The economizer 412 is fed by a flash tank that is connected to a port at a specific pressure in the compressor 402 and provides additional capacity/performance gains. In addition, by unloading the compressors 402 through varying speed of the rotors, the economizer 412 can be effective even during unloading operations because the economizer port will never be exposed to suction pressure of the compressor 402, which reduces performance, and therefore should provide additional performance and capacity to very low loads (within reason). At very light loads, the economizer feed can be closed using a solenoid valve to provide a reduction in the motor load. Furthermore, a flash tank will be used to separate gas from liquid at a partially expanded pressure. Gas will be fed to the economizer 412 from the top of the flash tank. The flash tank is a simple vertical tank with an expansion feed valve from the condenser 408 to provide a partially expanded liquid-gas fluid mixture. Liquid will drain from the flash tank through a second expansion drain valve to the evaporator 410.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of increasing the output capacity of a screw compressor, the method comprising the steps of:
    providing a motor having a predetermined rated operational voltage and frequency, wherein the predetermined rated operational voltage and frequency of the motor generates a predetermined output speed of the motor;
    providing a variable speed drive capable of supplying a voltage and frequency to the motor greater than the predetermined rated operational voltage and frequency of the motor;
    connecting a screw compressor to the motor, the screw compressor having a predetermined output capacity in response to operation at the predetermined output speed of the motor;
    operating the variable speed drive to supply a voltage and frequency to the motor greater than the predetermined rated operational voltage and frequency of the motor, the motor generating an output speed greater than the predetermined output speed of the motor as a result of the supplied voltage and frequency to the motor being greater than the predetermined rated operational voltage and frequency of the motor; and
    driving the screw compressor at the generated output speed of the motor greater than the predetermined output speed of the motor to obtain an output capacity from the screw compressor greater than the predetermined output capacity of the screw compressor.

2. The method of claim 1 further comprising the step of operating the motor in a constant flux mode of operation.

3. The method of claim 1 further comprising the step of boosting the output voltage of the variable speed drive to be at least twice an input voltage to the variable speed drive.

4. The method of claim 3 wherein the predetermined rated operational voltage of the motor is substantially equal to the input voltage to the variable speed drive.

5. The method of claim 1 wherein the predetermined rated operational voltage of the motor is less than an input voltage to the variable speed drive.

6. The method of claim 1 further comprising the step of eliminating a slide valve for capacity control from the screw compressor.

7. A compression system comprising:
    a motor having a predetermined rated operational voltage and frequency, the motor being configured to generate a predetermined output speed in response to operation at the predetermined rated operational voltage and frequency;
    a variable speed drive connected to the motor to power the motor, the variable speed drive being configured to supply a variable output voltage and variable output frequency to the motor, the variable output voltage and variable output frequency ranging between an output voltage and output frequency less than the predetermined rated operational voltage and frequency and an output voltage and output frequency greater than the predetermined rated operational voltage and frequency;

a screw compressor connected to the motor, the screw compressor being configured to provide a predetermined output capacity in response to being driven at the predetermined output speed of the motor; and wherein the motor generates an output speed greater than the predetermined output speed in response to operation at a supplied voltage and frequency greater than the predetermined rated operational voltage and frequency and the screw compressor provides an output capacity greater than the predetermined output capacity in response to being driven at an output speed of the motor greater than the predetermined output speed of the motor.

8. The compression system of claim 7 wherein the variable speed drive is configured to provide an output voltage to the motor greater than an input voltage to the variable speed drive.

9. The compression system of claim 8 wherein the variable speed drive is configured to provide an output voltage to the motor that is at least twice the input voltage to the variable speed drive.

10. The compression system of claim 9 wherein the predetermined rated operational voltage of the motor is substantially equal to the input voltage to the variable speed drive.

11. The compression system of claim 7 wherein the predetermined rated operational voltage of the motor is less than an input voltage to the variable speed drive.

12. The compression system of claim 7 wherein the variable speed drive supplies an output voltage and output frequency to the motor to permit the motor to operate in a constant flux mode of operation.

13. The compression system of claim 7 wherein the screw compressor has increased rotor seal in response to being driven at an output speed of the motor greater than the predetermined output speed of the motor.

14. The compression system of claim 7 wherein the screw compressor is configured to omit a slide valve to reduce gas leakage in the screw compressor.

15. A chiller system comprising:
a first refrigerant circuit, the first refrigerant circuit comprising a first compressor, a first condenser arrangement and a first evaporator arrangement connected in a closed refrigerant loop;
a second refrigerant circuit, the second refrigerant circuit comprising a second compressor, a second condenser arrangement and a second evaporator arrangement connected in a closed refrigerant loop;
a first motor connected to the first compressor to drive the first compressor, the first motor having a predetermined rated operational voltage and frequency, the first motor being configured to drive the first compressor at a predetermined speed in response to the predetermined rated operational voltage and frequency of the first motor being provided to the first motor, and the first compressor having a predetermined capacity in response to being driven at the predetermined speed;
a second motor connected to the second compressor to drive the second compressor, the second motor having a predetermined rated operational voltage and frequency, the second motor being configured to drive the second compressor at a predetermined speed in response to the predetermined rated operational voltage and frequency of the second motor being provided to the second motor, and the second compressor having a predetermined capacity in response to being driven at the predetermined speed;

at least one variable speed drive connected to the first motor and the second motor to power the first motor and the second motor; the at least one variable speed drive being configured to supply a variable output voltage and variable output frequency to the first motor and the second motor, the variable output voltage and variable output frequency ranging between an output voltage and output frequency less than the predetermined rated operational voltages and frequencies of the first motor and the second motor and an output voltage and output frequency greater than the predetermined rated operational voltages and frequencies of the first motor and the second motor;

wherein the first motor drives the first compressor at a speed greater than the predetermined speed in response to a supplied output voltage and output frequency from the at least one variable speed drive being greater than the predetermined rated operational voltage and frequency of the first motor, the first compressor provides an output capacity greater than the predetermined output capacity in response to being driven by the first motor at an output speed greater than the predetermined output speed; and wherein the second motor drives the second compressor at a speed greater than the predetermined speed in response to a supplied output voltage and output frequency from the at least one variable speed drive being greater than the predetermined rated operational voltage and frequency of the second motor, the second compressor provides an output capacity greater than the predetermined output capacity in response to being driven by the second motor at an output speed greater than the predetermined output speed.

16. The chiller system of claim 15 wherein the first compressor and the second compressor are screw compressors.

17. The chiller system of claim 16 wherein the first screw compressor and the second screw compressor each have increased rotor seal in response to being driven at a speed greater than the predetermined speed.

18. The chiller system of claim 16 wherein the first screw compressor and the second screw compressor are configured to omit a slide valve to reduce gas leakage in the first screw compressor and the second screw compressor.

19. The chiller system of claim 15 wherein the at least one variable speed drive comprises:
a first variable speed drive connected to the first motor to power the first motor; and
a second variable speed drive connected to the second motor to power the second motor.

20. The chiller system of claim 15 wherein the at least one variable speed drive comprises a single variable speed drive having a first inverter section connected to the first motor and a second inverter section connected to the second motor.

21. The chiller system of claim 15 wherein the predetermined rated operational voltage and frequency of the first motor and the second motor is 138 VAC and 60 Hz.

22. The chiller system of claim 21 wherein the at least one variable speed drive is configured to supply an output voltage of 460 VAC and an output frequency of 200 Hz to the first motor and the second motor.

23. The chiller system of claim 21 wherein the variable output frequency supplied by the at least one variable speed drive ranges from about 20 Hz to about 200 Hz.

24. The chiller system of claim 15 wherein the first compressor and the second compressor each comprise a muffler system.

25. The chiller system of claim 15 wherein the first condenser arrangement and the second condenser arrangement each comprise a portion of a combined condenser system.

26. The chiller system of claim 25 wherein the combined condenser system is air-cooled.

27. The chiller system of claim 15 wherein the first evaporator arrangement and the second evaporator arrangement each comprise a portion of a combined evaporator system.

28. The chiller system of claim 15 further comprising a VSD cooling system to cool the at least one variable speed drive.

29. The chiller system of claim 28 wherein the VSD cooling system comprises a brine loop of an ethylene-glycol and water mixture.

30. The chiller system of claim 28 wherein the VSD cooling system comprises a brine loop of a propylene-glycol and water mixture.

31. The chiller system of claim 30 wherein the first condenser arrangement, the second condenser arrangement and the brine loop of the VSD cooling system each comprise a portion of a combined condenser system.

32. The chiller system of claim 31 wherein the combined condenser system is air-cooled.

33. The chiller system of claim 15 wherein:
the first refrigerant circuit comprises a first economizer; and
the second refrigerant circuit comprises a second economizer.

34. The chiller system of claim 33 wherein the first economizer and the second economizer each comprise a flash tank.

35. The chiller system of claim 15 wherein the first refrigerant circuit and the second refrigerant circuit each circulate R-134a refrigerant.

* * * * *

UNITED STATES PATENT AND TRADEMARK OFFICE
CERTIFICATE OF CORRECTION

PATENT NO. : 7,096,681 B2 Page 1 of 1
APPLICATION NO. : 10/788723
DATED : August 29, 2006
INVENTOR(S) : Frank Eugene Wills et al.

It is certified that error appears in the above-identified patent and that said Letters Patent is hereby corrected as shown below:

Title Page, Inventors (75), Replace "Mahesh VALIYA-NADUVATH" with --Mahesh VALIYA NADUVATH--.

Signed and Sealed this

Nineteenth Day of August, 2008

JON W. DUDAS
*Director of the United States Patent and Trademark Office*